(12) United States Patent
Pink

(10) Patent No.: US 10,755,113 B2
(45) Date of Patent: Aug. 25, 2020

(54) METHOD AND DEVICE FOR ESTIMATING AN INHERENT MOVEMENT OF A VEHICLE

(71) Applicant: Robert Bosch GmbH, Stuttgart (DE)

(72) Inventor: Oliver Pink, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 16/106,243

(22) Filed: Aug. 21, 2018

(65) Prior Publication Data

US 2019/0065865 A1    Feb. 28, 2019

(30) Foreign Application Priority Data

Aug. 22, 2017    (DE) .......................... 10 2017 214 666

(51) Int. Cl.

| | |
|---|---|
| *G06K 9/00* | (2006.01) |
| *G06K 9/62* | (2006.01) |
| *B60T 7/18* | (2006.01) |
| *B60T 17/22* | (2006.01) |
| *B60T 8/17* | (2006.01) |
| *B60T 8/00* | (2006.01) |
| *B60T 7/12* | (2006.01) |
| *B62D 15/02* | (2006.01) |

(52) U.S. Cl.
CPC ............ *G06K 9/00791* (2013.01); *B60T 7/12* (2013.01); *B60T 7/18* (2013.01); *B60T 8/00* (2013.01); *B60T 8/17* (2013.01); *B60T 17/22* (2013.01); *G06K 9/00335* (2013.01); *G06K 9/6282* (2013.01); *B60T 2201/089* (2013.01); *B60T 2210/30* (2013.01); *B60T 2210/36* (2013.01); *B62D 15/029* (2013.01)

(58) Field of Classification Search
CPC ........... G06K 9/00791; G06K 9/00335; G06K 9/6282; B60T 7/12; B60T 7/18; B60T 8/00; B60T 8/17; B60T 17/22
See application file for complete search history.

(56) References Cited

U.S. PATENT DOCUMENTS 4,670,845 A * 6/1987 Etoh ....................... B60K 31/04
                                                       701/301
10,435,022 B2 * 10/2019 Brandin ............... B62D 15/021
(Continued)

OTHER PUBLICATIONS

Kang, et al.: "Texture Segmentation of Road Environment Scene Using SfM Module and HLAC Features", IPSJ Transactions on Computer Vision and Applications 1(2009), pp. 220-230.
(Continued)

*Primary Examiner* — David F Dunphy
(74) *Attorney, Agent, or Firm* — Norton Rose Fulbright US LLP; Gerard Messina

(57) ABSTRACT

A method for estimating an inherent movement of a vehicle. The method includes a step of classifying, a step of detecting, and a step of ascertaining. In the step of classifying, at least one portion of a camera image representing a classified object is classified into an object category which represents stationary objects. In the step of detecting, at least one detection point of the portion in the camera image classified into the object category is detected in the camera image by utilizing a detection algorithm. In the step of ascertaining, an estimated inherent movement of the vehicle is ascertained by utilizing the detection point.

10 Claims, 3 Drawing Sheets

(56) References Cited

U.S. PATENT DOCUMENTS

| | | |
|---|---|---|
| 2005/0206224 A1* | 9/2005 | Lu .............................. B60T 7/12 |
| | | 303/7 |
| 2009/0263009 A1 | 10/2009 | Krishnaswamy et al. |
| 2009/0278672 A1* | 11/2009 | Weilkes ................ B60W 50/14 |
| | | 340/435 |
| 2018/0101178 A1* | 4/2018 | Yoon .................. G06K 9/00791 |
| 2019/0142374 A1* | 5/2019 | Kruecker ............. A61B 8/4254 |
| | | 600/462 |
| 2019/0377354 A1* | 12/2019 | Shalev-Shwartz ....... G08G 1/16 |

OTHER PUBLICATIONS

Yamaguchi, et al.: "Moving Obstacle Detection using Monocular Vision", Intelligent Vehicle Symposium Jun. 13-15, 2006, Tokyo, Japan, pp. 288-293.

* cited by examiner

METHOD AND DEVICE FOR ESTIMATING AN INHERENT MOVEMENT OF A VEHICLE

CROSS REFERENCE

The present application claims the benefit under 35 U.S.C. § 119 of German Patent Application No. DE 102017214666.4 filed on Aug. 22, 2017, which is expressly incorporated herein by reference in its entirety.

BACKGROUND INFORMATION

The present invention is directed to a device, a method and a computer program.

Modern driver assistance systems and automated driving require a precise determination of the vehicle movement. Inertial sensor systems, wheel signals, and surroundings sensors are utilized in this case. If a video camera is installed in the vehicle, the inherent movement of the vehicle may be highly precisely estimated on the basis of the shifting of distinctive points in the image. Assuming rigid, unmoved surroundings, the movement of the vehicle is inferred in this way.

One conventional method is distinguished by the fact that it is particularly robust even in the event of breaches of the assumption of a rigid scene, for example by other moving vehicles. The reason therefor is the use of a robust estimation method, for example, the so-called random sample consensus (RANSAC), with the aid of which a hypothesis for the movement is determined, which is supported by a preferably large number of distinctive image points. One further similar method is described in U.S. Published Patent Application No. 2009/0263009 A1, in which RANSAC is utilized for outlier suppression in the movement estimation. In recent years, methods for the semantic segmentation of image information, for example, with the aid of deep learning, have also made considerable advances.

SUMMARY

In accordance with the present invention, a method is provided for estimating an inherent movement of a vehicle. A device which utilizes this method, and a corresponding computer program are also provided. Advantageous refinements of and improvements on the device described herein are possible as a result of the measures described herein.

Advantages achievable with the aid of the presented approach lie in the fact that an accuracy of an estimated inherent movement of a vehicle is greatly increased by utilizing the method presented here, since stationary or unmoved classified objects in the surroundings of the vehicle are exclusively taken into account in the estimation of the inherent movement of the vehicle.

A method for estimating an inherent movement of a vehicle is presented. The method includes a step of classifying, a step of detecting, and a step of ascertaining. In the step of classifying, at least one portion of a camera image representing a classified object is classified into an object category which represents stationary objects. In the step of detecting, at least one detection point of the portion in the camera image classified into the object category is detected in the camera image by utilizing a detection algorithm. In the step of ascertaining, an estimated inherent movement of the vehicle is ascertained by utilizing the detection point.

The vehicle may be a motor vehicle which is steered, in a driving operation, over a roadway. The vehicle may also be a vehicle which is movable or moving in the air, such as an aircraft, however. A classified object is understood to be a detected object which has been assigned to an object class. Objects of several different object classes may be classified into the object category. A stationary object is understood to be an object which cannot move, since the stationary object is bound to a fixed location, for example, a streetlight. Detected objects of the "streetlight" object class would therefore be assigned to the object category.

The step of classifying may take place by utilizing a semantic segmentation method. In the step of detecting, the detection point may be understood to be, for example, a distinctive point such as an edge which is to be rapidly and easily ascertained and may be easily tracked. In the step of ascertaining, the estimated inherent movement of the vehicle may be ascertained by utilizing the detection point and a visual odometry method.

This method may be implemented, for example, in software or hardware or in a mixed form of software and hardware, for example, in a control unit.

Since, in the method presented here, classified objects are classified into the object category before the estimated inherent movement is ascertained, it may be advantageously made possible that only such detection points on classified objects are taken into account during the ascertainment of the estimated inherent movement of the vehicle which are stationarily situated and, therefore, form particularly reliable reference values for the estimation of inherent movement.

It is advantageous in this case when, in the step of classifying, at least one further portion of the camera image representing one further classified object is classified into one further object category which represents moving objects, the steps of detecting and of ascertaining being carried out independently of the further object category. This may prevent the situation in which moving objects contribute to an incorrect estimation of the inherent movement.

For example, the further portion may also be masked out from the camera image.

Advantageously, in the step of classifying, the portion of the camera image representing the classified object may be classified into the object category when the object has been classified as a roadway surface and/or a streetlight and/or a building and/or a road sign and/or vegetation. Such object classes and objects are unambiguously immovable. In this case, roadway markings, for example, may be detected as the detection points on the roadway surface and may be utilized for the further method.

In the step of detecting, the at least one detection point may be detected by utilizing a detection algorithm which is designed for detecting a corner and/or an edge and/or a brightness difference of the portion in the camera image as the detection point.

In order to also make movable or non-unambiguously identified objects identifiable, it is advantageous when, according to one specific embodiment of the method, in the step of ascertaining, at least one additional portion of the camera image representing an additional classified object is classified into an additional object category which represents movable objects. A movable object may be understood to be, for example, one further vehicle which may be situated either movingly, i.e., during a driving operation, or unmovingly, i.e., at a standstill or parked.

In order to be capable of identifying a movement state, moving or unmoving, of such a movable object, the method may include a step of recognizing, in which the movement state of the additional object is recognized.

In response to the step of recognizing, the additional portion representing the additional classified object may then be classified into the object category when, in the step of recognizing, the movement state is recognized as being "unmoved" or is classified into the further object category when the movement state is recognized, in the step of recognizing, as being "moved". By utilizing such a step of recognizing, the situation may also be prevented in which moving objects contribute to an incorrect estimation of the inherent movement.

Moreover, one specific embodiment of the approach presented here is favorable, in which a step of controlling a driver assistance system by utilizing the estimated inherent movement of the vehicle is provided. In this way, a highly precise value for the inherent movement of the vehicle may be assumed or utilized in the driver assistance system. A driver assistance system may be considered to be, in this case, for example, a vehicle system which offers assistance to the driver during the guidance of the vehicle, for example, in the form of a lane departure warning system or an emergency braking system. In this case, the estimated inherent movement may be utilized as a plausibility check and/or a check of an inherent movement of the vehicle obtained in another way, for example, by utilizing satellite navigation systems and/or from a radar measurement, resulting in a more precise and better protected function of the driver assistance system.

The approach presented here furthermore provides a device which is designed for carrying out, controlling, or implementing the steps of a variant of a method presented here in corresponding units. The object of the approach may also be rapidly and efficiently achieved with the aid of this embodiment variant of the approach in the form of a device.

For this purpose, the device may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit being a flash memory, an EPROM, or a magnetic memory unit. The communication interface may be designed for reading in or outputting data in a wireless and/or wire-bound manner, a communication interface—which may read in or output wire-bound data—reading in these data, for example, electrically or optically from a corresponding data transmission line or outputting these data into a corresponding data transmission line.

In the present case, a device may be understood to be an electrical device that processes sensor signals and, as a function thereof, outputs control and/or data signals. The device may include an interface, which may be in the form of hardware and/or software. In the case of an embodiment as hardware, the interfaces may be part of a so-called system ASIC, for example, which contains highly diverse functions of the device. It is also possible, however, that the interfaces are standalone, integrated circuits or are formed, at least in part, from discrete components. In the case of an embodiment as software, the interfaces may be software modules, which are present, for example, on a microcontroller in addition to other software modules.

In one advantageous embodiment, a control of an estimation of an inherent movement of a vehicle takes place by the device. For this purpose, the device may access sensor signals, for example. The control takes place at least with the aid of actuators such as a classification unit, a detection unit, and an ascertainment unit.

In addition, a computer program product or a computer program including program code is advantageous, which may be stored on a machine-readable carrier or memory medium such as a semiconductor memory, a hard drive memory or an optical memory, and which may be used for carrying out, implementing, and/or controlling the steps of the method according to one of the above-described specific embodiments, in particular when the program product or program is carried out on a computer or a device.

Exemplary embodiments of the present invention are represented in the figures and are described in greater detail below.

DETAILED DESCRIPTION OF EXAMPLE EMBODIMENTS

Figure 1:
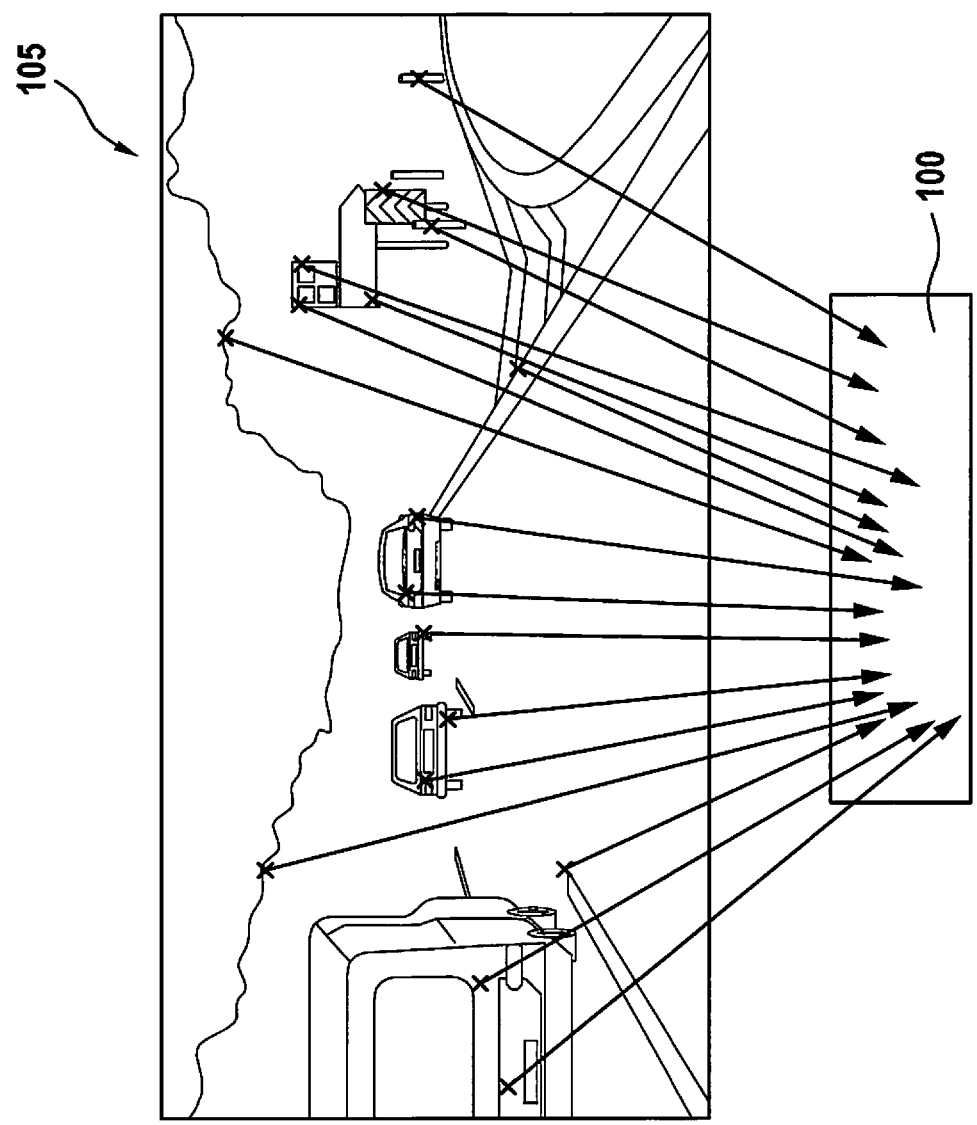
FIG. 1 shows a method for estimating an inherent movement of a vehicle.

In the description below of exemplary embodiments of the present approach, identical or similar reference numerals are used for the similarly functioning elements represented in the different figures, a repeated description of these elements being dispensed with.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

FIG. 1 shows a device 100 for estimating an inherent movement of a vehicle.

In a typical visual odometry shown here, device 100 selects the most distinctive points in a camera image 105, i.e., for example, corners, edges, and high brightness differences, in this case. In typical road scenes, these points frequently lie on additional moving vehicles, as is shown here. Device 100 shown here utilizes a method which is based on the assumption that a rigid scene takes up a preferably large portion of camera image 105, while other moving objects, however, take up only a small portion of camera image 105.

In the method of device 100 carried out here, errors, in particular, also occur during the estimation of the inherent movement when a better part of camera image 105 belongs to a moving object, for example, due to a preceding truck or at least one preceding other vehicle.

Figure 2:
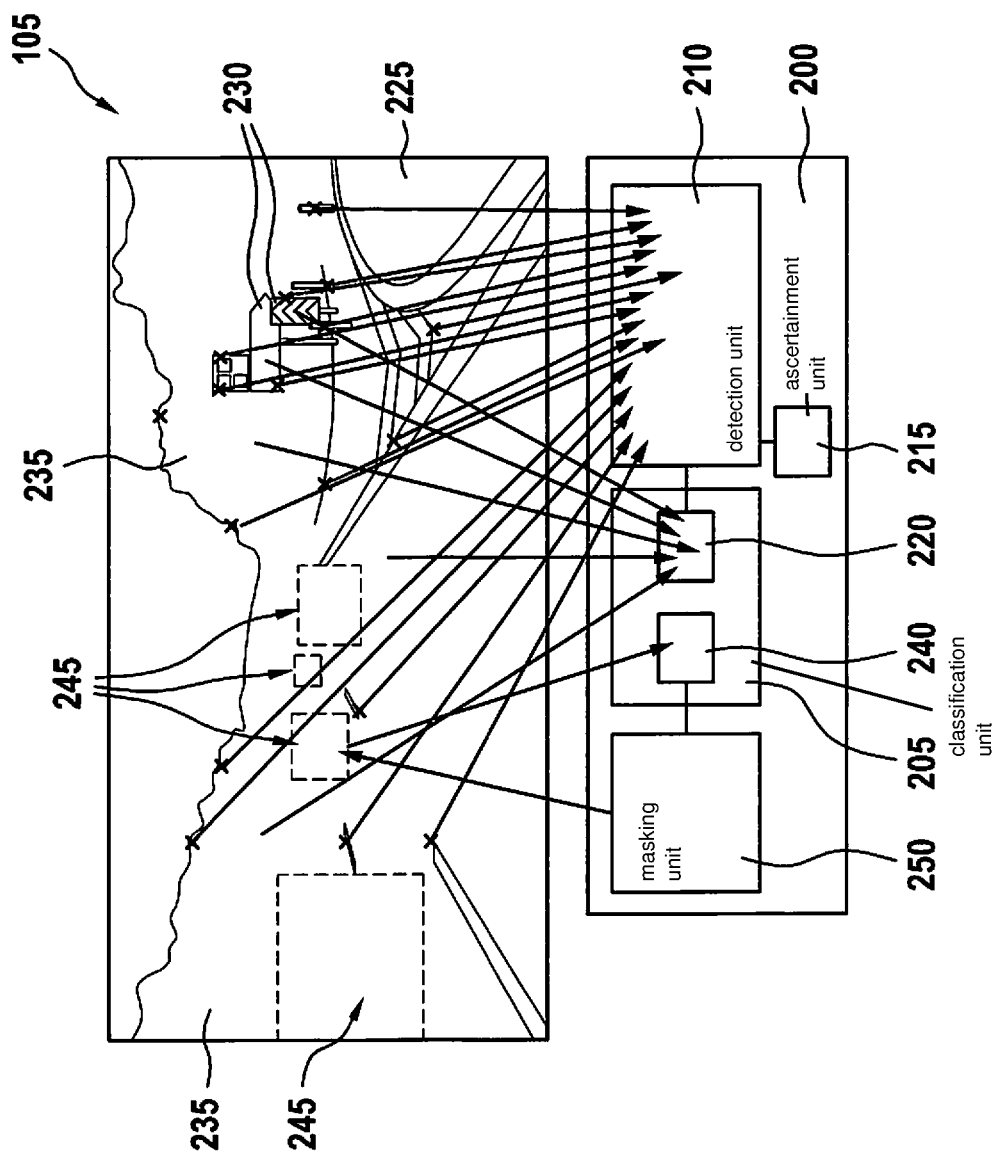
FIG. 2 shows a device for estimating an inherent movement of a vehicle according to one exemplary embodiment.

FIG. 2 shows a device 200 for estimating an inherent movement of a vehicle according to one exemplary embodiment. Camera image 105 may be camera image 105 shown in FIG. 1.

In contrast to the conventional device shown in FIG. 1, device 200 presented here includes a classification unit 205, a detection unit 210, and an ascertainment unit 215.

Classification unit 205 is designed for classifying at least one portion of camera image 105 representing a classified object into an object category 220 which represents stationary objects.

Detection unit 210 is designed for detecting at least one detection point of the portion in camera image 105 classified into object category 220 by utilizing a detection algorithm. Ascertainment unit 215 is designed for ascertaining an estimated inherent movement of the vehicle by utilizing the detection point.

According to this exemplary embodiment, classification unit 205 classifies those portions of camera image 105 representing classified objects into object category 220, in the case of which the classified objects have been classified as a roadway surface 225 and/or road signs 230 and/or vegetation 235.

According to this exemplary embodiment, classification unit 205 is also designed for classifying at least one further portion of camera image 105 representing one further classified object into one further object category 240 which represents moving objects, detection unit 210 and ascertainment unit 215 operating or carrying out steps independently of further object category 240.

According to this exemplary embodiment, classification unit 205 is also designed for classifying an additional portion of camera image 105 representing an additional classified object into an additional object category which represents stationary objects. According to this exemplary embodiment, classification unit 205 classifies additional portions of camera image 105 representing a plurality of additional classified objects into the additional object category, in the case of which the additional classified objects represent further vehicles 245.

According to this exemplary embodiment, device 200 includes a recognition unit which is designed for recognizing a movement state of the additional objects, i.e., further vehicles 245 in this case.

According to this exemplary embodiment, the recognition unit recognizes that further vehicles 245 are moving and, in response thereto, classifies the additional portions into further object category 240. When, according to one alternative exemplary embodiment, further vehicles 245 are recognized by the recognition unit as "unmoved," the additional portions are classified into object category 220 in response thereto.

According to this exemplary embodiment, device 200 also includes a masking unit 250 which is designed for masking out, in camera image 105, the further portions as well as those additional portions which have been classified into further object category 240.

According to this exemplary embodiment, detection unit 210 detects the detection points by utilizing a detection algorithm which is designed for detecting a corner and/or an edge and/or a brightness difference of the portion in camera image 105 as the at least one detection point.

Details of device 200 are described once more in greater detail in the following:

Device 200 presented here allows for a camera-based movement estimation with consideration for semantic information, for automated or highly automated driving.

A precise estimation of the inherent movement of a vehicle on the basis of camera images 105 from a vehicle camera of the vehicle is made possible. As compared to conventional methods, the method according to the present invention, which is implementable by device 200, is also capable of yielding a precise estimation when a better part of the scene represented in camera image 105 is made up of moving objects, for example, in a traffic jam or in a pedestrian zone.

One feature of the present invention is a combination of a semantic segmentation with visual odometry. In this case, camera image 105 is initially classified, for example, into the classes pedestrian, vehicle, streetlight, building, roadway surface, and vegetation. Thereafter, distinctive points, the detection points in this case, in camera image 105 are detected as in conventional visual odometry. In contrast to conventional devices, device 200 only searches for points in areas, however, which belong to object classes which are reliably unmoving, i.e., according to this exemplary embodiment, are only on roadway surface 225, on road signs 230, or vegetation 235, or, according to one alternative exemplary embodiment, on streetlights and/or on buildings. In this way, an incorrect estimation of the inherent movement based on moving objects, such as further vehicles 245 in this case, may be reliably ruled out.

According to this exemplary embodiment, all potentially moving or movable object classes are initially masked out with the aid of a semantic segmentation. Distinctive points are sought again in the remaining image. A total number of the distinctive points in FIG. 1 and of the detection points in FIG. 2 is identical, although, in FIG. 2, all detection points advantageously lie on static or stationary objects.

Figure 3:
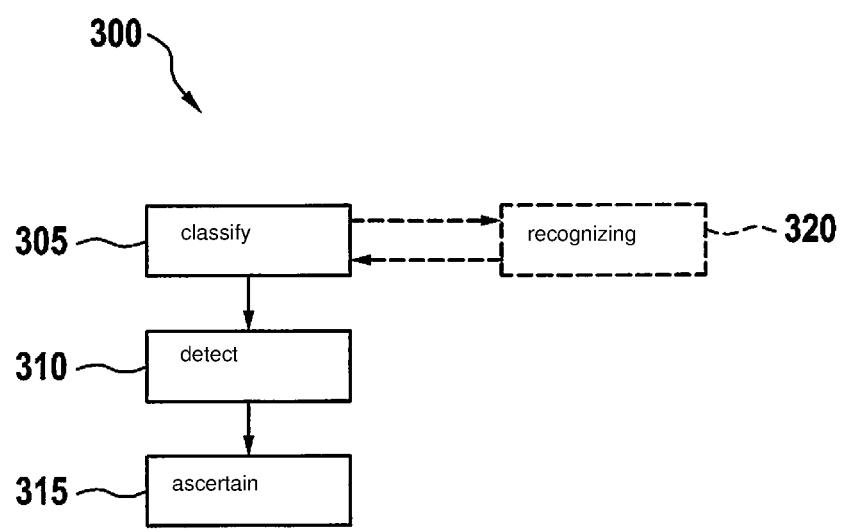
FIG. 3 shows a flow chart of a method for estimating an inherent movement of a vehicle according to one exemplary embodiment.

FIG. 3 shows a flow chart of a method 300 for estimating an inherent movement of a vehicle according to one exemplary embodiment. This may be a method 300 which is controllable or implementable on the basis of the device described with reference to FIG. 2.

Method 300 includes a step 305 of classifying, a step 310 of detecting, and a step 315 of ascertaining. In step 305 of classifying, at least one portion of a camera image representing a classified object is classified into an object category which represents stationary objects. In step 310 of detecting, at least one detection point of the portion in the camera image classified into the object category is detected in the camera image by utilizing a detection algorithm. In step 315 of ascertaining, an estimated inherent movement of the vehicle is ascertained by utilizing the detection point.

The exemplary embodiments described in the following and one additional step 320 of recognizing are optional.

According to this exemplary embodiment, in step 305 of classifying, at least one further portion of the camera image representing one further classified object is classified into one further object category which represents moving objects, steps 310, 315 of detecting and of ascertaining being carried out independently of the further object category.

According to this exemplary embodiment, in step 305 of classifying, the portion of the camera image representing the classified object may be classified into the object category when the object has been classified as a roadway surface and/or a streetlight and/or a building and/or a road sign and/or vegetation.

In step 310 of detecting, the at least one detection point may be detected by utilizing a detection algorithm which is designed for detecting a corner and/or an edge and/or a brightness difference of the portion in the camera image as the detection point.

According to this exemplary embodiment, in step 305 of classifying, at least one additional portion of the camera image representing an additional classified object is classified into an additional object category which represents movable objects.

In optional step 320 of recognizing, a movement state of the additional classified object is recognized. In response to step 320 of recognizing, the additional portion representing the additional classified object is classified into the object category when, in step 320 of recognizing, the movement state is recognized as being "unmoved" or is classified into the further object category when the movement state is recognized, in step 320 of recognizing, as being "moved."

The method steps presented here may be repeated and may be carried out in a sequence other than that described.

What is claimed is:

1. A method for estimating an inherent movement of a vehicle, the method comprising:
   classifying at least one portion of a camera image representing a classified object into an object category which represents stationary objects;
   detecting at least one detection point of the portion in the camera image classified into the object category by utilizing a detection algorithm; and
   ascertaining an estimated inherent movement of the vehicle by utilizing the detection point.

2. The method as recited in claim 1, wherein, in the step of classifying, at least one further portion of the camera image representing one further classified object is classified into one further object category which represents moving objects, the steps of detecting and of ascertaining being carried out independently of the further object category.

3. The method as recited in claim 1, wherein, in the step of classifying, the portion of the camera image representing the classified object is classified into the object category when the object has been classified as at least one of a roadway surface, a streetlight, a building, a road sign, and/or vegetation.

4. The method as recited in claim 1, wherein, in the step of detecting, the at least one detection point is detected by utilizing a detection algorithm which is designed for detecting at least one of a corner, an edge, and/or a brightness difference of the portion in the camera image as the detection point.

5. The method as recited in claim 1, wherein, in the step of classifying, at least one additional portion of the camera image representing an additional classified object is classified into an additional object category which represents movable objects.

6. The method as recited in claim 5, further comprising:
   recognizing, in which a movement state of the additional classified object is recognized.

7. The method as recited in claim 5, wherein the additional portion representing the additional classified object is classified into the object category when, in the step of recognizing, the movement state is recognized as being "unmoved" or is classified into the further object category when the movement state is recognized, in the step of recognizing, as being "moved."

8. The method as recited in claim 1, further comprising:
   controlling a driver assistance system by utilizing the estimated inherent movement of the vehicle.

9. A device for estimating an inherent movement of a vehicle, the device designed to:
   classify at least one portion of a camera image representing a classified object into an object category which represents stationary objects;
   detect at least one detection point of the portion in the camera image classified into the object category by utilize a detection algorithm; and
   ascertain an estimated inherent movement of the vehicle by utilizing the detection point.

10. A non-transitory machine-readable memory medium on which is stored a computer program for estimating an inherent movement of a vehicle, the computer program, when executed by a computer, causing the computer to perform:
    classifying at least one portion of a camera image representing a classified object into an object category which represents stationary objects;
    detecting at least one detection point of the portion in the camera image classified into the object category by utilizing a detection algorithm; and
    ascertaining an estimated inherent movement of the vehicle by utilizing the detection point.

* * * * *